United States Patent
Tian et al.

(10) Patent No.: US 10,102,741 B2
(45) Date of Patent: Oct. 16, 2018

(54) REMOTE CONTROL DEVICE FOR AIRCRAFT, AIRCRAFT SYSTEM AND REMOTE CONTROL METHOD FOR AIRCRAFT SYSTEM

(71) Applicant: YUNEEC TECHNOLOGY CO., LIMITED, Hong Kong (CN)

(72) Inventors: Yu Tian, Jiangsu (CN); Wenyan Jiang, Jiangsu (CN)

(73) Assignee: YUNEEC TECHNOLOGY CO., LIMITED, Hong Kong (CN)

( * ) Notice: Subject to any disclaimer, the term of this patent is extended or adjusted under 35 U.S.C. 154(b) by 0 days.

(21) Appl. No.: 15/553,735

(22) PCT Filed: Jul. 1, 2016

(86) PCT No.: PCT/CN2016/088065
§ 371 (c)(1),
(2) Date: Aug. 25, 2017

(87) PCT Pub. No.: WO2017/000908
PCT Pub. Date: Jan. 5, 2017

(65) Prior Publication Data
US 2018/0033294 A1  Feb. 1, 2018

(30) Foreign Application Priority Data
Jul. 1, 2015  (CN) ................ 2015 2 0465841 U

(51) Int. Cl.
*G08C 17/02* (2006.01)
*A63H 30/04* (2006.01)
(Continued)

(52) U.S. Cl.
CPC ............. *G08C 17/02* (2013.01); *A63H 27/02* (2013.01); *A63H 30/04* (2013.01); *G01C 21/20* (2013.01);
(Continued)

(58) Field of Classification Search
CPC ........ A63H 27/00; G05D 1/00; G05D 1/0011; G08C 17/00; G08C 17/02
See application file for complete search history.

(56) References Cited

U.S. PATENT DOCUMENTS 6,259,976 B1 * 7/2001 Lemelson ............... B64C 13/16
244/110 B
6,738,694 B2 * 5/2004 Koncelik, Jr. ....... G05D 1/0011
340/945

(Continued)

FOREIGN PATENT DOCUMENTS

WO       2013190101      12/2013

*Primary Examiner* — Carlos E Garcia

(57) ABSTRACT

A remote control device for an aircraft and an aircraft system are provided. The aircraft system includes the aircraft and the remote control device. The remote control device includes a first global positioning system (GPS) chip, a magnetometer, a gyroscope chip, a main control chip and a first signal transceiver. The first GPS chip, the magnetometer and the gyroscope chip are respectively connected with the main control chip, and the first signal transceiver is connected with the main control chip. The first GPS chip, the magnetometer and the gyroscope chip transmit three different position signals of the remote control device to the main control chip respectively; the main control chip transmits a control signal through the first signal transceiver, and the first signal transceiver receives a condition signal of the aircraft and then transmits to the main control chip.

2 Claims, 1 Drawing Sheet

(51) Int. Cl.
*A63H 27/00* (2006.01)
*G05D 1/00* (2006.01)
*G01C 21/20* (2006.01)
*G01C 9/00* (2006.01)
*G01S 19/13* (2010.01)
*H04L 29/08* (2006.01)

(52) U.S. Cl.
CPC ......... *G05D 1/0016* (2013.01); *H04L 67/125* (2013.01); *G01C 9/005* (2013.01); *G01S 19/13* (2013.01); *G08C 2201/32* (2013.01); *G08C 2201/51* (2013.01); *H04L 67/12* (2013.01)

(56) References Cited

U.S. PATENT DOCUMENTS

| | | | |
|---|---|---|---|
| 8,269,624 B2* | 9/2012 | Chen | G01S 19/49 340/539.13 |
| 2004/0220706 A1* | 11/2004 | Koncelik, Jr. | G05D 1/0011 701/9 |
| 2016/0293019 A1* | 10/2016 | Kim | G08G 5/0069 |
| 2018/0011486 A1* | 1/2018 | Tian | G05D 1/0022 |

* cited by examiner

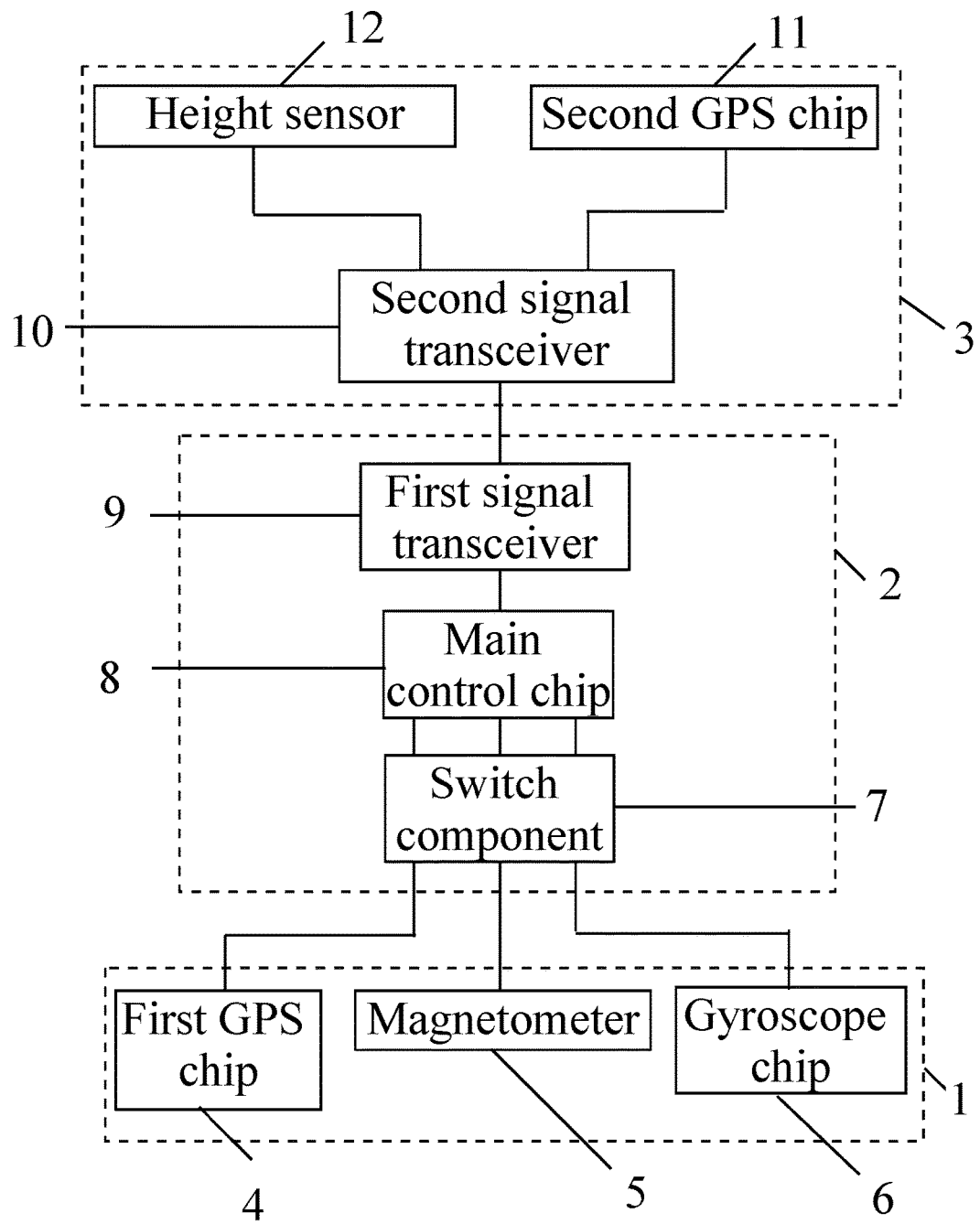

REMOTE CONTROL DEVICE FOR AIRCRAFT, AIRCRAFT SYSTEM AND REMOTE CONTROL METHOD FOR AIRCRAFT SYSTEM

CROSS REFERENCE OF RELATED APPLICATION

This is a U.S. National Stage under 35 U.S.C 371 of the International Application PCT/CN2016/088065, filed Jul. 1, 2016, which claims priority under 35 U.S.C. 119(a-d) to CN 201520465841.X, filed Jul. 1, 2015. All contents of the priority document are included into this application by reference.

BACKGROUND OF THE PRESENT INVENTION

Field of Invention

The present invention relates to a remote control device for an aircraft, an aircraft system and a remote control method for the aircraft system.

Description of Related Arts

The conventional remote control device for the aircraft generally adopts the button and the rocker to control the flight direction and distance of the aircraft, in such a manner that it is difficult and inconvenient to operate the aircraft and the interest during the operation process is reduced.

SUMMARY OF THE PRESENT INVENTION

An object of the present invention is to provide a remote control device for an aircraft, an aircraft system and a remote control method for the aircraft system, so as to solve defects of a conventional remote control device for the aircraft in prior art that it is difficult and inconvenient to operate the aircraft and interest during an operation process is reduced.

Through following technical solutions, the present invention solves above technical problems.

A remote control device for an aircraft comprises a first global positioning system (GPS) chip, a magnetometer, a gyroscope chip, a main control chip and a first signal transceiver.

The first GPS chip, the magnetometer and the gyroscope chip are respectively connected with the main control chip, and the first signal transceiver is connected with the main control chip.

The first GPS chip, the magnetometer and the gyroscope chip transmit three different position signals of the remote control device to the main control chip respectively; then the main control chip transmits a control signal through the first signal transceiver; and, the first signal transceiver receives a condition signal of the aircraft and then transmits the condition signal to the main control chip.

Preferably, the remote control device comprises a command device and an overall remote control unit, wherein: the command device comprises the first GPS chip, the magnetometer and the gyroscope chip; the overall remote control unit comprises the main control chip and the first signal transceiver; and the command device is connected with the overall remote control unit.

Further preferably, a casing of the command device is cylindrical or cube-shaped; the first GPS chip, the magnetometer and the gyroscope chip are all arranged inside the command device; and the casing of the command device brings a more comfortable holding feeling to an operator.

Preferably, the overall remote control unit further comprises a switch component, wherein the switch component is connected between the command device and the main control chip.

Preferably, the magnetometer and the gyroscope chip are both connected to the main control chip through an inter-integrated circuit (I2C) bus.

Preferably, the first GPS chip and the first signal transceiver are both connected to the main control chip through an interface of a universal synchronous/asynchronous receiver/transmitter (USART).

An aircraft system comprises the aircraft and the remote control device for the aircraft.

Preferably, the aircraft comprises a second GPS chip and a second signal transceiver, wherein: the second GPS chip is connected with the second signal transceiver; the second signal transceiver is wirelessly connected to the first signal transceiver; the second GPS chip transmits a position signal of the aircraft through the second signal transceiver; and, the second signal transceiver and the first signal transceiver transmit the signals to each other.

Preferably, the aircraft further comprises a height sensor, wherein: the height sensor is connected with the second signal transceiver; and the height sensor transmits a height signal of the aircraft through the second signal transceiver.

Preferably, the first signal transceiver and the second signal transceiver are both radio frequency (RF) transceivers.

Positive effects of the present invention are described as follows.

The remote control device for the aircraft provided by the present invention adopts a command remote control technology, which is able to operate a flight direction and a flight distance of the aircraft conveniently, has a high operation precision on the aircraft, and increases the interest during the operation process.

BRIEF DESCRIPTION OF THE DRAWINGS

The drawing is a structural sketch view of an aircraft system according to a preferred embodiment of the present invention.

DETAILED DESCRIPTION OF THE PREFERRED EMBODIMENT

Referring to the drawing, according to a preferred embodiment of the present invention, an aircraft system comprises an aircraft 3 and a remote control device for the aircraft.

The remote control device for the aircraft comprises a command device 1 and an overall remote control unit 2, wherein: the command device 1 is connected with the overall remote control unit 2; the command device 1 comprises a first global positioning system (GPS) chip 4, a magnetometer 5 and a gyroscope chip 6; a casing of the command device 1 is cylindrical or cube-shaped, and brings a more comfortable holding feeling to an operator; the first GPS chip 4, the magnetometer 5 and the gyroscope chip 6 are all arranged inside the command device 1; the overall remote control unit 2 comprises a main control chip 8, a first signal transceiver 9 and a switch component 7; the first GPS chip 4, the magnetometer 5 and the gyroscope chip 6 are respectively connected with the main control chip 8 through the switch component 7; the switch component 7 is for starting the command device 1; the first GPS chip 4 and the first signal transceiver 9 are both connected to the main control chip 8 through an interface of a universal synchronous/asynchronous receiver/transmitter (USART); and, the magnetometer 5 and the gyroscope chip 6 are both connected to the main control chip 8 through an inter-integrated circuit (I2C) bus.

The aircraft 3 comprises a second GPS chip 11, a second signal transceiver 10 and a height sensor 12, wherein: the height sensor 12 and the second GPS chip 11 are respectively connected with the second signal transceiver 10; the second signal transceiver 10 is wirelessly connected to the first signal transceiver 9; and, the first signal transceiver 9 and the second signal transceiver 10 are both radio frequency (RF) transceivers.

The first GPS chip 4, the magnetometer 5 and the gyroscope chip 6 transmit respective collected position information of the command device 1 to the main control chip 8 respectively; the second GPS chip 11 and the height sensor 12 respectively transmit position information and height information of the aircraft 3 to the second signal transceiver 10; the second signal transceiver 10 transmits the position information and the height information of the aircraft 3 to the first signal transceiver 9; the first signal transceiver 9 then transmits the position information and the height information of the aircraft 3 to the main control chip 8; and the main control chip 8 transmits a control signal to the second signal transceiver 10 through the first signal transceiver 9, so as to operate a flight direction and a flight distance of the aircraft 3.

When operating the aircraft 3, after the command device 1 is started through the switch component 7, a distance L between the command device 1 and the aircraft 3 is obtained through latitude and longitude coordinates measured by the first GPS chip 4 and the second GPS chip 11; a connection line A is made between the command device 1 and the aircraft 3, and thereafter an included angle α (0-360°) between the connection line A and a true north direction is obtained; after the command device 1 is pointed to an operation direction B, an included angle β (0-360°) between the operation direction B and the true north direction is obtained through the magnetometer 5; an inclination angle γ between the command device 1 and ground is obtained through the gyroscope chip 6; after obtaining three-dimensional information of the command device 1, the overall remote control unit 2 transmits operation information to the aircraft 3, then the aircraft 3 flies with a flight angle of (α+β) and the distance of L without changing a vertical height, and thereafter the aircraft 3 flies with a specified height and direction according to a height H calculated by the inclination angle γ and the distance L; and, during a flight process, the height sensor 12 measures the flight height of the aircraft 3 in real-time, so that the flight height is more accurate. Through the command remote control of the command device 1, the flight direction and distance of the aircraft 3 can be operated conveniently, the operation precision on the aircraft 3 is high, and the interest during the operation process is increased.

The preferred embodiment of the present invention is described above. One skilled in the art should understand that the preferred embodiment is exemplary only, and various variations and modifications can be made without departing from the principle and the essence of the present invention. Thus, the protection scope of the present invention is limited by the following claims.

What is claimed is:
1. A remote control method for an aircraft system, wherein:
   the aircraft system comprises an aircraft and a remote control device for the aircraft;
   the remote control device comprises a first global positioning system (GPS) chip, a magnetometer, a gyroscope chip, a main control chip and a first signal transceiver;
   the first GPS chip, the magnetometer and the gyroscope chip are respectively connected with the main control chip, and the first signal transceiver is connected with the main control chip;
   the first GPS chip, the magnetometer and the gyroscope chip transmit three different position signals of the remote control device to the main control chip respectively; the main control chip transmits a control signal through the first signal transceiver; and, the first signal transceiver receives a condition signal of the aircraft and transmits the condition signal to the main control chip;
   the aircraft comprises a second GPS chip and a second signal transceiver; the second GPS chip is connected with the second signal transceiver; the second signal transceiver is wirelessly connected to the first signal transceiver; the second GPS chip transmits a position signal of the aircraft through the second signal transceiver; and, the second signal transceiver and the first signal transceiver transmit the signals to each other; and
   the remote control method comprises steps of:
   S1, obtaining a distance between the remote control device and the aircraft through the first GPS chip and the second GPS chip;
   S2, obtaining a first included angle between a connection line and a standard direction, wherein the connection line is made between the remote control device and the aircraft;
   S3, being pointed to an operation direction by the remote control device, and then obtaining a second included angle between the operation direction and the standard direction through the magnetometer;
   S4, obtaining an inclination angle between the remote control device and ground through the gyroscope chip;
   S5, transmitting operation information to the aircraft by the remote control device according to three-dimensional information of the remote control device; and
   S6, by the aircraft, flying with a flight angle of the first included angle plus the second included angle, a height calculated through the inclination angle and the distance between the remote control device and the aircraft, and the distance from the remote control device.
2. The remote control method for the aircraft system, as recited in claim 1, wherein the standard direction is a true north direction.

* * * * *